April 5, 1960 R. LEDUC 2,931,167
AIR INTAKE ARRANGEMENT FOR SUPERSONIC AIRCRAFT
Filed Feb. 2, 1954
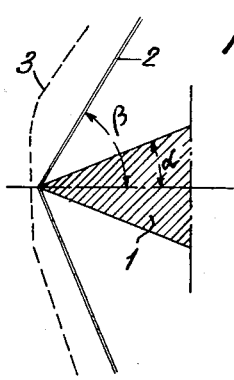
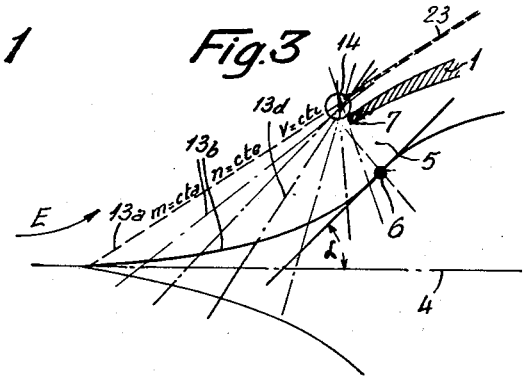
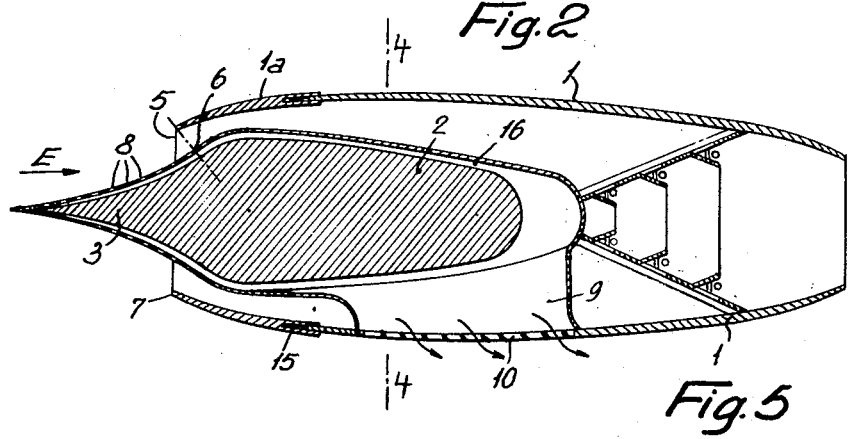
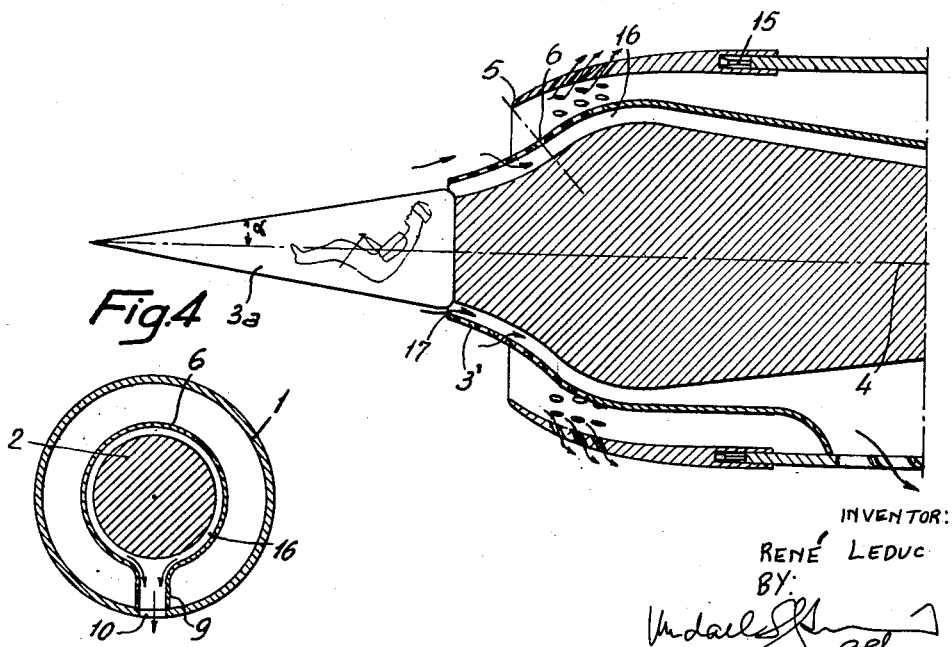
INVENTOR:
RENÉ LEDUC
BY:

United States Patent Office 2,931,167
Patented Apr. 5, 1960

2,931,167
AIR INTAKE ARRANGEMENT FOR SUPERSONIC AIRCRAFT

René Leduc, Argenteuil, France

Application February 2, 1954, Serial No. 407,791
Claims priority, application France February 6, 1953
9 Claims. (Cl. 60—35.6)

The present invention relates to reactive propulsion engines, and more particularly to engines of this type which are adapted to travel at supersonic speeds.

It is known that reactive propulsion engines or power plants which are thermally propelled and which may include turbo-motors or gas turbines, can only be of practical use if the efficiency of the compression which takes place in the forward part of the power plant is between 0.90 and 1. In effect, the net thrust which can be obtained with power plants of this type is equal to the difference between the thrust produced by the reaction of the gases spouting from outlet end of the tubular shell of plants of this type and the drag resulting from the compression of the gases. For example, if the compression of the gases requires 500 units of power and if the force of reaction of the gases at the outlet of the power plant is 700 units of power, then the net power is 200 units of power. Thus, in this example, the power required for compression is 2.5 times the net power. It is evident, therefore, that power plants of this type can only be considered as a practical means of propulsion to the extent that it is possible to have an extremely high efficiency of compression. When dealing with sub-sonic aircraft, there is no particular problem. However, supersonic aircraft form shock waves which result in losses of energy which up to the present time have not been overcome.

One of the objects of the present invention is to overcome the above drawbacks by providing a reactive propulsion engine adapted to travel at supersonic speeds with an extremely high efficiency of compression in the forward part of the engine.

Another object of the present invention is to provide an engine of the above type which is capable of controlling the speed of air entering the engine in such a way that it always enters the engine at approximately the speed of sound.

A further object of the present invention is to provide a ram jet engine having a needle projecting forwardly from the inlet ram thereof and having a curvature which provides shock waves that envelop an annular ring having a cross section which approaches the size of a point so that disturbances in the operation of the engine may be reduced by locating the front end of the inlet ram within this ring.

Furthermore, it is an object of the present invention to provide a means for adjusting the cross section of the inlet through which air enters the engine.

With the above objects in view, the present invention mainly consists of a reactive propulsion engine adapted to travel at supersonic speeds and including a tubular shell having an inlet ram at its forward end. A needle is mounted in the tubular shell substantially coaxially therewith and has a substantially pointed portion extending from the interior of the front end portion of the inlet ram forwardly beyond the latter and defining an annular inlet therewith, the outer surface of this pointed portion of the needle having in the region of the front end of the inlet ram a circle of inflection located in a plane normal to the axis of the shell and having its center substantially in this axis, this outer surface of the pointed portion of the needle further having in any plane passing through the needle and including the axis of the shell tangents which make with this axis angles which progressively increase in the downstream direction up to a point on the circle of inflection and which gradually decrease downstream of this point, the said surface of the pointed portion of the needle being foraminous at least in a region extending forwardly from the circle of inflection. A passage means provides communication between the foraminous surface portion of the needle and the exterior of the tubular shell at a region where the ambient fluid is disturbed to a relatively small degree and where the static pressure is substantially equal to the pressure upstream of the inlet ram at a zone undisturbed by the engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 diagrammatically illustrates the formation of shock waves at the pointed portion of a cone travelling at supersonic speeds;

Fig. 2 is a sectional elevational view taken along a central plane of a ram jet engine constructed in accordance with the present inventions, Fig. 2 being partly diagrammatic for the sake of clarity;

Fig. 3 diagrammatically illustrates shock waves formed with the needle of the invention as well as the relation between the front end of the inlet ram and the shock waves and needle;

Fig. 4 is a sectional view taken along the line 4—4 of Fig. 2; and

Fig. 5 is a fragmentary diagrammatic view on an enlarged scale of a different embodiment of the forward portion of a ram jet engine constructed in accordance with the present invention.

Fig. 1 of the drawings illustrates the phenomena which occur at supersonic speeds. The cone 1 is shown in Fig. 1 as having an apex angle of $2\alpha$, and if this cone travels along its axis at supersonic speeds, experience has shown that a shock wave of conical form will be produced, as shown by the shock wave 2 of Fig. 1, this shock wave being coaxial with the cone 1 and having an apex angle $2\beta$ which is a function of the speed of the cone (Mach number) of the angle $2\alpha$. Upstream of the cone the flow of air is not disturbed, while downstream of the cone the streams of fluid are deviated and diminish, and the downstream pressure is greater than the upstream pressure.

Experience has also shown that for a cone of the type shown in Fig. 1, before it has obtained a speed of a predetermined Mach number, the best efficiencies of compression which can be obtained are on the order of 0.8, which is too low of a value to serve as a basis for the practical construction of an engine which includes a conical needle coaxial with the tubular shell of the engine and defining therewith an annular convergent entrance for the gas.

The above description is equally applicable to a reactive propulsion engine whose air inlet is in the form of a simple conical converging portion, so that engines of such a construction cannot operate at supersonic speeds with acceptable compression efficiencies.

To overcome these disadvantages, it was at first thought that improvements would be derived from an engine whose forward portion had a profile more appropriate than a simple cone or a simple conical convergence and by giving the engine an angle of attack α (Fig. 1) which progressively increases in such a way as to minimize the shock waves and thus arrive at a suitable curve which progressively decreases the speed of the fluid to a speed having a Mach number of 1 at the throat of the engine, the pressure rising correspondingly in a continuous manner and without the formation of a zone of turbulence so as to avoid the losses produced by such a zone.

Experience with such a construction, in supersonic wind tunnels, has proved that, contrary to expectations, there is no increase in efficiency as compared to a simple cone. Instead, there is produced, in effect, a complete mixing of the fluid in the zone circling the forward portion of the engine, and this phenomenon is accompanied by blocking of the entrance to the engine, creation of shock waves, etc.

In the course of experiments, a completely unpredictable phenomenon was found, namely, that by combining with a forward portion of an engine shaped as discussed above structure for drawing off the boundary layer of air along the curved surface not only was the flow of fluid completely stabilized but in addition the efficiency of compression was tremendously increased to a surprising degree. The results obtained with experiments in a wind tunnel with the structure of the invention at a Mach number of 2 showed efficiencies of compression on the order of 0.97 to 0.98, and the possibility approaching even closer to unity is not excluded.

These extremely favorable results were obtained, in accordance with the invention, by providing within the tubular shell of a ram jet engine, coaxially with this shell, a needle projecting forwardly beyond the inlet ram of the shell and having its forwardly projecting end portion in the shape of a substantially conical surface having in the region of the front end of the inlet ram a circle of inflection whose center is in the axis of the shell and having in any plane passing through the needle and including the axis of the shell tangents which make with its axis angles increasing progressively in the downstream direction until a maximum angle is obtained at a point on the circle of inflection, these angles then decreasing progressively downstream of this point, and this surface being foraminous at least in a portion thereof extending forwardly from the circle of inflection, the foraminous surface portion communicating by any suitable means when the exterior of the shell at a region where the ambient fluid is disturbed to a relatively small degree and where as a result there is a static pressure substantially equal to the pressure upstream of the inlet ram at a zone undisturbed by the engine.

In accordance with the present invention, it is provided, in order to avoid shock waves at the inlet of the engine and in order to increase the flexibility of the apparatus, that the maximum angle between the axis of the tubular shell and the tangents to the surface of the needle be determined as a function of the particular characteristics of the apparatus (especially the Mach number for which the apparatus is designed) in such a way that the reduction in speed of the air flowing into the engine, produced by compression thereof along the needle, results in a speed of fluid at the inlet of the engine which is substantially equal to the speed of sound. The air thus enters into the engine at the speed of sound, which is to say without disturbances, and thus the apparatus is capable of functioning properly at a variety of Mach numbers.

As may be seen from Figs. 2–4, the engine of the invention includes a substantially cylindrical tubular shell 1 having at its forward end portion an inlet ram 1a. A needle 2 is located within the shell 1 coaxially therewith and has a forwardly projecting portion 3 extending from the interior of the shell 1 and defining with the inlet ram 1a an annular inlet 5. The outer surface of the forward portion 3 of needle 1 has in the region of the front end 7 of the inlet ram 1a a circle of inflection 6. The term "circle of inflection" is intended to mean a circle along which are located points on the outer surface of the needle portion 3 at which tangents to this surface portion make, in the instant case, a maximum angle with the axis of the shell 1. The center of the circle of inflection 6 is located substantially in the axis of the shell 1, and the curvature of the outer surface of needle portion 3 is such that in any plane passing through this needle portion and including the axis 4 of the shell 1 tangents to the outer surface of needle portion 3 make with the axis 4 angles which progressively increase in the downstream direction up to a point on the circle of inflection 6, as shown at α in Fig. 3 where the arrow E indicates the direction of fluid flow, these angles decreasing progressively downstream of the circle of inflection. As is evident from Fig. 3 as well as Fig. 2, the circle of inflection is located in the region of the front end 7 of the inlet ram and in the illustrated example is shown just inside of the front end of the inlet ram. Also, the surface of the needle portion 3 is foraminous, and in the example shown in Fig. 2, the foraminous characteristic of this surface is provided by forming apertures in the outer surface portion of needle section 3, although it is possible to provide any type of perforations, orifices, openings or even a porous wall portion. This foraminous region is required, in accordance with the present invention, to be located at least at a part of the needle extending forwardly from the circle of inflection 6. The foraminous portion of the needle communicates by a passage means, which, in the illustrated example, is in the form of a duct 9, with the outer surface of the shell at the zone 10 distant from the ends of the shell, by providing outlets in the wall of this part of the shell (Figs. 2 and 4), where the ambient fluid is least disturbed by the movement of the engine and where the pressure closely approaches the pressure upstream of the inlet ram at a zone undisturbed by the engine.

As is apparent from Fig. 3, each element of the surface of the forward portion 3 of needle 2 deviates the stream of air to produce the shock waves indicated with the lines 13a, 13b, 13c, etc. The shock waves illustrated in Fig. 3 are theoretical, because of the progressive change in the angle α, but these lines graphically represent the curves of shock waves at equal Mach numbers or the isobars of fluid flow.

In accordance with the present invention the circle of inflection 6 and the front end 7 of the inlet ram are located at a shock wave corresponding to a Mach number of substantially 1, which is to say at the zone where the speed of fluid flow has been reduced to a speed substantially equal to the speed of sound, so that in this way the entrance of shock waves into the engine is avoided and it is possible to operate the engine properly through a range of different Mach numbers.

Also, in accordance with the present invention, the curvature of the outer surface of the front portion 3 of the needle is such that in any plane passing through the needle and including the axis 4 the traces of the shock waves 13a, 13b, 13c, etc. envelop an annular zone 14 of extremely small cross section, the front end 7 of the inlet ram being placed in the interior of the annular zone 14 between the axis 4 and the zone 14. In other words, these traces almost intersect along a circle included in the annular zone 14, some of the traces extending above the zone, some below the zone, some forwardly of the zone, and some rearwardly of the zone so that this zone 14 is enveloped by these traces. This zone 14 is indicated in Fig. 3 substantially as a dot enveloped by the lines indicating the shock waves, and a circle is drawn around this dot in Fig. 3 so as to more clearly illustrate the same. This zone 14 is actually a source of great disturbance from which the shock wave 23 emanates (Fig. 3), and the described and illustrated location of the front end of the inlet ram with respect to the zone 14 avoids inconveniences and operational troubles which might result from a different disposition of the inlet ram. Of course, the front end 7 of the inlet ram may be located at any desired region between the needle and zone 14.

Furthermore, in order to be able to regulate the cross section of the annular inlet at will and in flight, the inlet ram 1a of the shell 1 is movable along the axis of the shell with respect to the major part of the shell which carries the inlet ram 1a. The inlet ram 1a is formed at its rear edge portion with an annular groove into which the front end of the remainder of shell 1 slidably extends, as is most clearly shown in Fig. 5, and a plurality of control rods 15 which are operated through any suitable means such as servo-motors or the like are connected to the inlet ram 1a and slidably mounted on the shell 1 for axially moving the inlet ram 1a with respect to the remainder of the shell 1 to effect the desired change in the cross section of the air inlet. The rods 15 may be manually controlled by the pilot or they may be automatically controlled in any suitable way, such as, for example, in accordance with the pressure at the entrance to the engine and/or in accordance with the temperature of the engine.

As was pointed out above, the foraminous part of the surface of the needle may be provided in any number of suitable ways, and structures suitable for this purpose are disclosed in French Patents No. 779,655 of January 2, 1934, and No. 1,003,823 of February 28, 1947.

In the practical construction of the apparatus according to the invention the needle can be constructed in the manner illustrated, that is to say in the form of a central body which through any suitable pins or the like carries an outer wall spaced from the central body by a gap 16 and formed with the openings 8 of Fig. 2, this space 16 serving to draw off the boundary layer of air and communicating with the duct 9 which leads to the zone 10. Moreover, the foraminous portion of the needle may be continued advantageously beyond the circle of inflection 6, and a portion of the inlet ram adjacent to this front end 7 may also be foraminous, as is indicated in Fig. 5.

The distribution of the openings on the outer wall of the needle need not be uniform over the entire surface of the needle. In particular, at the outer extremity of the needle where there is a very low pressure the openings are of little effect and thus they have to be relatively more numerous, while in the region of the front end of the inlet ram where the openings much more effectively draw off the boundary layer, the openings may be more widely distributed, and this is true particularly in the region immediately preceding the front end of the inlet ram.

This fact and the practical importance of providing the needle with a pointed front end whose extremity has an extremely small apex angle leads to the embodiment illustrated in Fig. 5, this embodiment being characterized by the fact that the needle portion 3′ is provided with an apex angle which is not negligible but is nevertheless sufficiently small to create only shock waves which are practically negligible, the front end 3a of the needle having a smooth surface, and being adapted to house the pilot, as shown diagrammatically in Fig. 5, and being followed by an outer surface of the needle portion 3′ which has a curvature conforming to the above requirements and which is foraminous as described above. As is apparent from Fig. 5 the front end 17 of the outer wall of the needle of this embodiment slightly overlaps the rear end of the cone 3a to provide an annular gap which is sufficiently large to immediately swallow up the boundary layer of air which accumulates on cone 3a at the point where this boundary layer of air arrives at the foraminous surface of the needle. It should be noted that the flow of fluid along the cone 3a presents no particular problem since the angle thereof is constant, so that the speed of the fluid along the cone is never zero and the boundary layer of air, of course with a slight loss, does not provide any undesired disturbances since it is efficiently evacuated to the rear. Quite the contrary operation takes place in the zone located between the needle and the front end portion of the inlet ram where it is important to provide a suitable distribution of perforations because the progressive increase in compression tends to produce a mixing of the fluid, the prevention of the flow thereof, and a blocking of the engine, as has been discussed above. The annular gap formed between the rear end of cone 3a and the front end 17 of the outer wall of needle 3′ prevents the boundary layer of air on the cone 3a from adding its effects to those which are produced in the zone immediately downstream of the cone 3a.

The present invention is not only applicable to thermopropulsive aircraft, but is also equally applicable to all sorts of devices which are adapted to be propelled either under their own power or by an extraneous source of power at supersonic speeds.

It will be understood that each of the elements described above, or two or more together, may also find a useful application in other types of reactive propulsion engines differing from the types described above.

While the invention has been illustrated and described as embodied in a ram jet engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a reactive propulsion engine adapted to travel at supersonic speeds, in combination, a tubular shell having an inlet end portion at its forward end; a needle mounted in said tubular shell substantially coaxially therewith and having a substantially pointed portion extending from the interior of the front end portion of said shell forwardly beyond the latter and defining an annular inlet therewith, the outer surface of said pointed portion of said needle having in the region of the front end of said inlet ram a circle of inflection located in a plane normal to the axis of said shell and having its center substantially in said axis, and said outer surface having in any plane passing through said needle and including the axis of said shell tangents which make with said axis angles which progressively increase in the downstream direction up to a point on said circle of inflection and which gradually decrease downstream of said point, the said surface being foraminous at least in a region extending forwardly from said circle of inflection; and passage means providing communication between said foraminous surface portion of said needle and the exterior of said shell at a region where the ambient fluid is disturbed to a relatively small degree and where the static pressure is substantially equal to the pressure upstream of the inlet ram at a zone undisturbed by the engine.

2. In a reactive propulsion engine adapted to travel at supersonic speeds, in combination, a tubular shell having an inlet end portion at its forward end; a needle mounted in said tubular shell substantially coaxially therewith and having a substantially pointed portion extending from the interior of the front end portion of said shell forwardly beyond the latter and defining an annular inlet therewith, the outer surface of said pointed portion of said needle having in the region of the front end of said inlet ram a circle of inflection located in a plane normal to the axis of said shell and having its center substantially in said axis, and said outer surface having in any plane passing through said needle and including the axis of said shell tangents which make with said axis angles which progressively increase in the downstream direction up to a point on said circle of inflection and which gradually decrease downstream of said point, the said surface being foraminous at least in a region extending forwardly from said circle of inflection and the maximum angle between said tangents and said axis providing a reduction in the speed of fluid flowing into said inlet up to approximately the speed of sound; and passage means providing communication between said foraminous surface portion of said needle and the exterior of said shell at a region where the ambient fluid is disturbed to a relatively small degree and where the static pressure is substantially equal to the pressure upstream of the inlet ram at a zone undisturbed by the engine.

3. In a reactive propulsion engine adapted to travel at supersonic speeds, in combination, a tubular shell having a main body portion and having an inlet end portion slidably carried at the front end portion of said main body portion for movement along the axis of said shell; a needle mounted in said tubular shell substantially coaxially therewith and having a substantially pointed portion extending from the interior of the front end portion of said shell forwardly beyond the latter and defining an annular inlet therewith, the outer surface of said pointed portion of said needle having in the region of the front end of said inlet ram a circle of inflection located in a plane normal to the axis of said shell and having its center substantially in said axis, and said outer surface having in any plane passing through said needle and including the axis of said shell tangents which make with said axis angles which progressively increase in the downstream direction up to a point on said circle of inflection and which gradually decrease downstream of said point, the said surface being foraminous at least in a region extending forwardly from said circle of inflection; and passage means providing communication between said foraminous surface portion of said needle and the exterior of said shell at a region where the ambient fluid is disturbed to a relatively small degree and where the static pressure is substantially equal to the pressure upstream of the inlet ram at a zone undisturbed by the engine.

4. In a reactive propulsion engine as defined in claim 1, said needle being in the form of an inner body and an outer wall spaced from said inner body, having said outer surface of said pointed portion of said needle, and being foraminous in said region extending forwardly from said inflection circle.

5. In a reactive propulsion engine as defined in claim 4, said needle being in the form of a cone at its extreme forward portion and said outer wall having a front end which slightly overlaps and is spaced from the rear end of said cone to define therewith an annular gap through which the boundary layer of air on said cone is drawn off.

6. In a reactive propulsion engine as defined in claim 4, said passage means being in the form of a duct communicating with the space between said inner body and said outer wall.

7. In a reactive propulsion engine adapted to travel at supersonic speeds, in combination, a tubular shell having an inlet ram at its forward end; a needle mounted in said tubular shell substantially coaxially therewith and having a substantially pointed portion extending from the interior of the front end portion of said inlet ram forwardly beyond the latter and defining an annular inlet therewith, the outer surface of said pointed portion of said needle having just inside of the front end of said inlet ram a circle of inflection located in a plane normal to the axis of said shell and having its center substantially in said axis, and said outer surface having in any plane passing through said needle and including the axis of said shell tangents which make with said axis angles which progressively increase in the downstream direction up to a point on said circle of inflection and which gradually decrease downstream of said point, the said surface being foraminous at least in a region extending forwardly from said circle of inflection; and passage means providing communication between said foraminous surface portion of said needle and the exterior of said shell at a region where the ambient fluid is disturbed to a relatively small degree and where the static pressure is substantially equal to the pressure upstream of the inlet ram at a zone undisturbed by the engine.

8. In a reactive propulsion engine adapted to travel at supersonic speeds, in combination, a tubular shell having an inlet ram at its forward end; a needle mounted in said tubular shell substantially coaxially therewith and having a substantially pointed portion extending from the interior of the front end portion of said inlet ram forwardly beyond the latter and defining an annular inlet therewith, the outer surface of said pointed portion of said needle having in the region of the front end of said inlet ram a circle of inflection located in a plane normal to the axis of said shell and having its center substantially in said axis, and said outer surface having in any plane passing through said needle and including the axis of said shell tangents which make with said axis angles which progressively increase in the downstream direction up to a point on said circle of inflection, which are of a size that produce a decrease in the speed of fluid flow to approximately the speed of sound at said circle of inflection, and which gradually decrease downstream of said point, the said surface being foraminous at least in a region extending forwardly from said circle of inflection; and passage means providing communication between said foraminous surface portion of said needle and the exterior of said shell at a region where the ambient fluid is disturbed to a relatively small degree and where the static pressure is substantially equal to the pressure at infinity.

9. In a reactive propulsion engine as defined in claim 1, said needle being in the form of an inner body having a conical configuration at its forward portion and said needle including an outer wall spaced from said inner body, having said outer surface of said pointed portion of said needle, and being foraminous in said region extending forwardly from said inflection circle, said outer wall having an annular front end located rearwardly of the front end of said inner body and defining therewith an annular gap through which the boundary layer of air on the portion of said inner body extending forwardly from said outer wall is drawn off.

References Cited in the file of this patent

UNITED STATES PATENTS

| 2,503,973 | Smith | Apr. 11, 1950 |
| 2,540,594 | Price | Feb. 6, 1951 |
| 2,589,945 | Leduc | Mar. 18, 1952 |
| 2,638,738 | Salter | May 19, 1953 |
| 2,663,140 | Price | Dec. 22, 1953 |
| 2,683,962 | Griffith | July 20, 1954 |

FOREIGN PATENTS

| 50,033 | France | Aug. 1, 1939 |